(12) United States Patent
Adibowo

(10) Patent No.: US 11,367,048 B2
(45) Date of Patent: Jun. 21, 2022

(54) AUTOMATED CREATION OF DIGITAL AFFINITY DIAGRAMS

(71) Applicant: SAP SE, Walldorf (DE)

(72) Inventor: Sasmito Adibowo, Singapore (SG)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 16/435,708

(22) Filed: Jun. 10, 2019

(65) Prior Publication Data

US 2020/0387871 A1 Dec. 10, 2020

(51) Int. Cl.
*G06Q 10/10* (2012.01)
*G06F 16/904* (2019.01)
*G06K 9/62* (2022.01)
*G06V 40/20* (2022.01)

(52) U.S. Cl.
CPC ......... *G06Q 10/101* (2013.01); *G06F 16/904* (2019.01); *G06K 9/6218* (2013.01); *G06V 40/20* (2022.01)

(58) Field of Classification Search
CPC .................................................. G06Q 10/101
See application file for complete search history.

(56) References Cited

U.S. PATENT DOCUMENTS

| | | | |
|---|---|---|---|
| 9,858,552 B2 | 1/2018 | Kowalkiewicz et al. | |
| 2002/0149617 A1* | 10/2002 | Becker | H04N 7/18 |
| 2004/0017400 A1* | 1/2004 | Ly et al. | G09G 5/00 |
| 2012/0324372 A1* | 12/2012 | Kowalkiewicz et al. | G06F 3/01 |
| 2015/0100326 A1 | 4/2015 | Kowalkiewicz et al. | |
| 2015/0100382 A1 | 4/2015 | Malhotra et al. | |
| 2015/0106699 A1* | 4/2015 | Somasundaram et al. | G06F 17/212 |
| 2015/0176997 A1 | 6/2015 | Pursche et al. | |
| 2015/0269642 A1 | 9/2015 | Cai et al. | |
| 2015/0381937 A1 | 12/2015 | Adibowo | |
| 2018/0060953 A1 | 3/2018 | Adibowo | |
| 2018/0240038 A1 | 8/2018 | Adibowo et al. | |
| 2018/0260693 A1 | 9/2018 | Dahlmeier et al. | |
| 2019/0087239 A1 | 3/2019 | Adibowo | |
| 2019/0272332 A1* | 9/2019 | Kudssi | G06F 17/30 |

OTHER PUBLICATIONS

U.S. Appl. No. 16/170,183, Sasmito Adibowo, filed Oct. 23, 2018.
U.S. Appl. No. 16/183,441, Sasmito Adibowo, filed Nov. 7, 2018.
(Continued)

*Primary Examiner* — James J Debrow
(74) *Attorney, Agent, or Firm* — Fish & Richardson P.C.

(57) ABSTRACT

The present disclosure is directed to systems and methods including generating image data and audio data during a collaborative work using a stereoscopic camera system and a binaural microphone system, determining that physical media have been affixed to a work surface and, for each physical medium, providing a digital object including data representative of the physical medium, and determining that a session has ended, and in response, automatically: processing at least a portion of data of the digital objects using one or more clustering algorithms to provide two or more groups of digital objects, and providing an affinity diagram including the two or more groups of diagrams, the affinity diagram being displayed as digital representations of the physical media, the digital representations being grouped in the two or more groups.

20 Claims, 5 Drawing Sheets

(56) References Cited

OTHER PUBLICATIONS

Dam, et al., "Affinity Diagrams—Learn How to Cluster and Bundle Ideas and Facts" Interaction Design Foundation, Available on or before Mar. 21, 2019, Wayback Machine URL, <http://web.archive.org/web/20190321225113/https://www.interaction-design.org/literature/article/affinity-diagrams-learn-how-to-cluster-and-bundle-ideas-and-facts> [retrieved on Jun. 10, 2019] Retrieved from: URL <https://www.interaction-design.org/literature/article/affinity-diagrams-learn-how-to-cluster-and-bundle-ideas-and-facts>, 8 pages.
Epson, EB-710Ui, Epson Datasheet/brochure Dec. 4, 2018, 4 pages.
Medium.com: Towards Data Science "Speaker Differentiation Using Deep Learning", Dec. 21, 2018, [retrieved on Jun. 10, 2019], retrieved from: URL <https://towardsdatascience.com/speaker-differentiation-using-deep-learning-68b2dede498f>, 6 pages.
Miro.com, "Miro Realtimeboard Features" Updated 2019, [Retrieved on Jun. 11, 2019], retrieved from: URL <https://miro.com/features/>, 2 pages.
NVIDIA News. NVIDIA.com, "NVIDIA Announces Jetson Nano $99 Tiny, Yet Mighty NVIDIA Cuda-X AI Computer That Runs All AI Models" NVIDIA Newsroom, Mar. 18, 2019, [retrieved on Jun. 10, 2019] Retrieved from: URL <https://nvidianews.nvidia.com/news/nvidia-announces-jetson-nano-99-tiny-yet-mighty-nvidia-cuda-x-ai-computer-that-runs-all-ai-models>, 7 pages.
Post-it.com, "Post It App Faq", Updated 2019, [Retrieved on Jun. 11, 2019], retrieved from: URL <https://www.post-it.com/3M/en_US/post-it/ideas/app/faq/?utm_medium=redirect&utm_source=vanity-url&utm_campaign=www.post-it.com/3M/en_US/post-it/ideas/plus-app/faq/>, 3 pages.
Stormboard.com, "Product Tour", Updated 2019, [Retrieved on Jun. 11, 2019], retrieved from: URL <https://stormboard.com/product/tour>, 16 pages.
Wikipedia Contributors, "Binaural Recording", The Free Encyclopedia. Wikipedia Reference, Available on or before March, 4, 2019, Wayback Machine URL, <http://web.archive.org/web/20190304162242/https://en.wikipedia.org/wiki/Binaural_recording> [retrieved on Jun. 10, 2019] Retrieved from: URL <https://en.wikipedia.org/wiki/Binaural_recording>, 6pages.
Wikipedia Contributors, "Cluster Analysis", The Free Encyclopedia. Wikipedia Reference, Available on or before Mar. 14, 2018, Wayback Machine URL, <http://web.archive.org/web/20190314014445/https://en.wikipedia.org/wiki/Cluster_analysis> [retrieved on Jun. 10, 2019] Retrieved from: URL <https://en.wikipedia.org/wiki/Cluster_analysis>, 11 pages.
Wikipedia Contributors, "DjVu" Wikipedia, The Free Encyclopedia. Wikipedia Reference, Available on or before Mar. 22, 2019, Wayback Machine URL, <http://web.archive.org/web/20190322054321/https://en.wikipedia.org/wiki/DjVu> [retrieved on Jun. 10, 2019] Retrieved from: URL <https://en.wikipedia.org/wiki/DjVu, 6 pages.
Wikipedia Contributors, "PDF" Wikipedia, The Free Encyclopedia. Wikipedia Reference Mar. 2019, Wayback Machine URL,<http://web.archive.org/web/20190320043637/https://en.wikipedia.org/wiki/PDF> [retrieved on Jun. 10, 2019] Retrieved from: URL <https://en.wikipedia.org/wiki/PDF>, 10 pages.
Wikipedia Contributors, "Raspberry PI", The Free Encyclopedia. Wikipedia Reference, Available on or before Mar. 9, 2018, Wayback Machine URL, <http://web.archive.org/web/20190309045718/https://en.wikipedia.org/wiki/Raspberry_Pi> [retrieved on Jun. 10, 2019] Retrieved from: URL <https://en.wikipedia.org/wiki/Raspberry_Pi>, 22 pages.
Wikipedia Contributors, "Stereo Camera", The Free Encyclopedia. Wikipedia Reference, Available on or before Feb. 1, 2019, Wayback Machine URL, <http://web.archive.org/web/20190201002357/https://en.wikipedia.org/wiki/Stereo_camera> [retrieved on Jun. 10, 2019] Retrieved from: URL<https://en.wikipedia.org/wiki/Stereo_camera, 4 pages.
Wikipedia Contributors, "Topic Model", The Free Encyclopedia. Wikipedia Reference, Available on or before Feb. 14, 2018, Wayback Machine URL, <http://web.archive.org/web/20190214180021/https://en.wikipedia.org/wiki/Topic_model> [retrieved on Jun. 10, 2019] Retrieved from: URL <https://en.wikipedia.org/wiki/Topic_model>, 3 pages.
Wikipedia Contributors, "USB Hardware", The Free Encyclopedia. Wikipedia Reference, Available on or before Mar. 1, 2019, Wayback Machine URL, <http://web.archive.org/web/20190301210922/https://en.wikipedia.org/wiki/USB_hardware> [retrieved on Jun. 11, 2019] Retrieved from: URL <https://en.wikipedia.org/wiki/USB_hardware>, 13 pages.
Xu, Pei. "A real-time hand gesture recognition and human-computer interaction system." *arXiv preprint arXiv: 1704.07296*, Apr. 2017, 8 pages.

\* cited by examiner

AUTOMATED CREATION OF DIGITAL AFFINITY DIAGRAMS

BACKGROUND

Collaborative teams are often formed to brainstorm and produce some type of output. For example, collaborative teams can work together in a creative environment to develop a layout of a website or to define a process. Early stages of discussion in creative environments often benefit from a "pen and packing paper" approach, during which team members each contribute to the collaborative effort using physical media, such as a whiteboard, markers, pens, and sticky notes.

For example, in a design thinking workshop, affinity diagrams can be generated. Affinity diagrams can be used in a brainstorming process that creates a diagram of ideas, in which related ideas are grouped together in clusters. Typically, the process is done in a shared physical space with multiple participants, a moderator, and physical media (e.g., a set of sticky notes, a drawing board). Using sticky-notes as an example physical medium, an affinity diagram is provided as a collection of sticky-notes, in which sticky-notes representing similar ideas and/or topics are grouped together and duplicate ideas are placed in an overlapping manner. Upon completion of the affinity diagram, the moderator digitally captures the affinity diagram (e.g., capturing a digital image) for later reference.

However, the process of grouping the physical media takes a significant amount of time, and digital recording of the affinity diagram can be incomplete. One issue is that a limited number of participants can be involved in the clustering process. For example, if participants are new and unfamiliar with a design thinking workshop process, then only the moderator would be able to do appropriately cluster the physical media. Another issue is that, although the affinity diagram can be digitally recorded (e.g., as an image), detail around the generation of the concepts and ideas underlying the affinity diagram is lost.

SUMMARY

Implementations of the present disclosure are directed to generating affinity diagrams. More particularly, implementations of the present disclosure are directed to automatically generating digital affinity diagrams based on physical media and data representative of human interactions with the physical media and/or each other during a session. Implementations of the present disclosure include operations of generating, by a sensing device, image data and audio data during a collaborative work within a collaborative environment, the sensing device including a stereoscopic camera system and a binaural microphone system, determining that physical media have been affixed to a work surface within the collaborative environment and, for each physical medium, providing a digital object including data representative of the physical medium, the data including an image of the physical medium and one or more topics that the physical medium is associated with, and determining that a session of the collaborative work has ended, and in response, automatically: processing at least a portion of data of the digital objects using one or more clustering algorithms to provide two or more groups of digital objects, and providing an affinity diagram including the two or more groups of diagrams, the affinity diagram being displayed as digital representations of the physical media, the digital representations being grouped in the two or more groups. Other implementations of this aspect include corresponding systems, apparatus, and computer programs, configured to perform the actions of the methods, encoded on computer storage devices.

These and other implementations can each optionally include one or more of the following features: the digital objects are clustered based on the one or more topics that the physical media are each associated with; text data is generated from the image data, the text data being processed to determine at least one topic of the one or more topics; gesture data is generated from the image data, the gesture data representative of one or more gestures of collaborators; determining that physical media have been affixed to the work surface within the collaborative environment is based on the gesture data; determining that physical media have been affixed to the work surface within the collaborative environment is based on the image data; and actions further include determining that feedback has been provided to the affinity diagram and, in response, updating one or more of the groups of digital objects.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is contemplated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
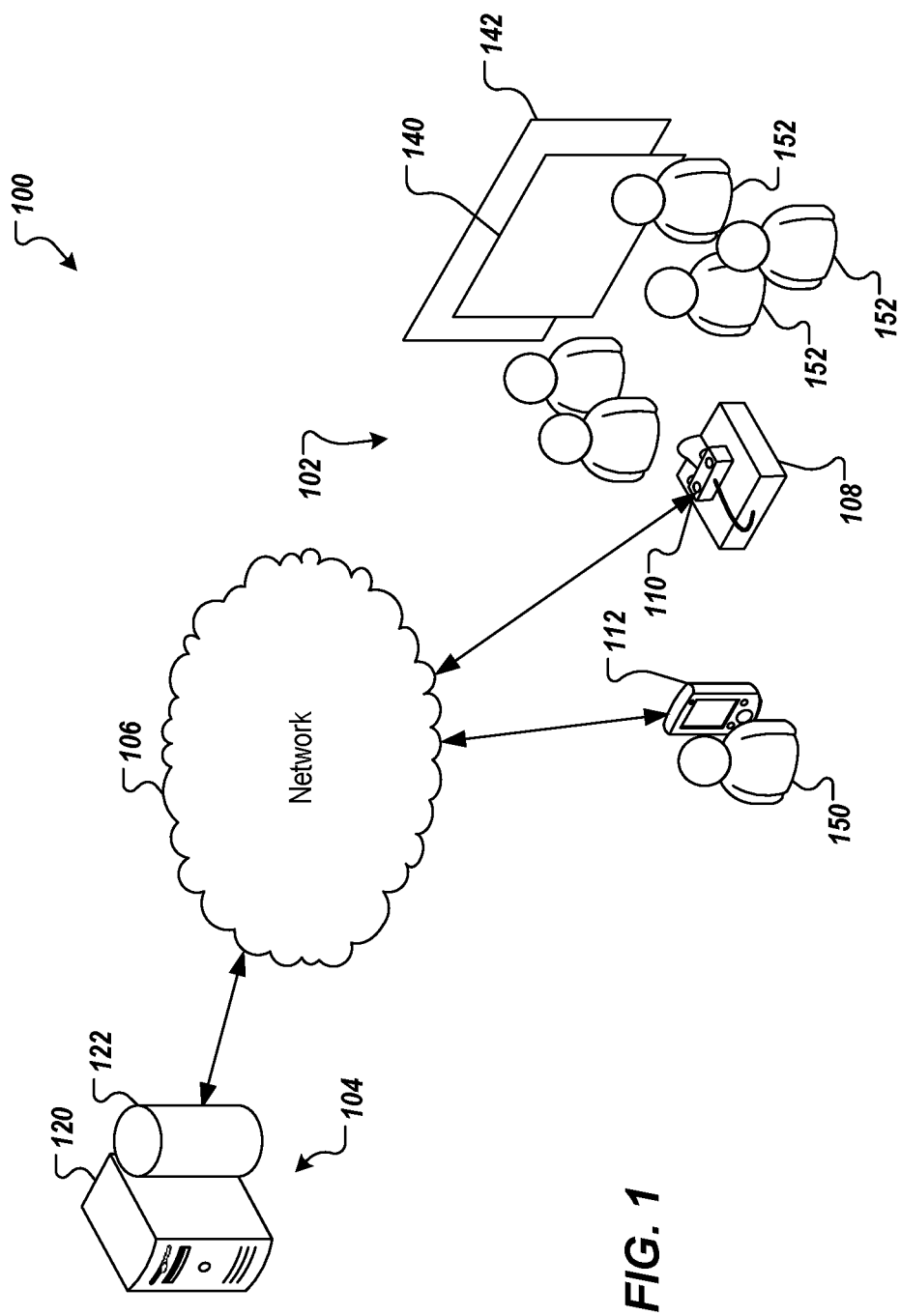
FIG. 1 depicts an example architecture in accordance with implementations of the present disclosure.

Implementations of the present disclosure are directed to automatically generating affinity diagrams. More particularly, implementations of the present disclosure are directed to automatically generating affinity diagrams in digital form based on collaborative work executed by multiple users using real-world, physical media. As described in further detail herein, digital affinity diagrams are automatically generated based on physical media and data representative of human interactions with the physical media and/or each other during a session. In some implementations, actions include generating, by a sensing device, image data and audio data during a collaborative work within a collaborative environment, the sensing device including a stereoscopic camera system and a binaural microphone system, determining that physical media have been affixed to a work surface within the collaborative environment and, for each physical medium, providing a digital object including data representative of the physical medium, the data including an image of the physical medium and one or more topics that the physical medium is associated with, and determining that a session of the collaborative work has ended, and in response, automatically: processing at least a portion of data of the digital objects using one or more clustering algorithms to provide two or more groups of digital objects, and providing an affinity diagram including the two or more groups of diagrams, the affinity diagram being displayed as digital representations of the physical media, the digital representations being grouped in the two or more groups.

To provide context for implementations of the present disclosure, the use of physical media (e.g., sticky-notes) is integral to collaborative processes in design thinking workshops and/or ideation sessions. Having a physical media (e.g., analog media) minimizes technology barriers and reduces distraction of participants. The physical media enables efficient use of time during an initial portion of a session, in which each participant generates and records ideas in solitude. For example, initially, participants work in solitude to thing and generate ideas around one or more topics. Participants do not initially exchange ideas during this time period of solitude to avoid premature evaluation, which typically reduces the potential pool of ideas and hinders the brainstorming process.

Using electronic devices as input tends to obstruct the overall process. For example, at the outset, a setup phase is required, during which the electronic devices (e.g., participants' laptop computers or smartphones) may need to log into a session (e.g., open a web browser, type in a hyperlink), and participants identify themselves to an application pointed by the hyperlink. In some instances, special-purpose electronic input devices (e.g., a locked-down tablet computer with preconfigured software) can be provided. In such cases, the participants are likely unfamiliar with the apparatus and would require training, which detracts from the overall efficiency of the session.

Further, the generation and capturing of affinity diagrams from the ideas generated during the session is traditionally cumbersome and incomplete. For example, manual organization of the physical media is cumbersome, time-consuming, and error prone. Further, digitally recording the physical affinity diagrams (e.g., capturing an image of the affinity diagram) does not account for numerous other details of the underlying ideas and participants, and is also difficult to digitally index (e.g., for subsequent searches). For example, further manual input is required to tag (likely incompletely) the digital recording for subsequent retrieval during search.

In view of this, and as introduced above, implementations of the present disclosure are directed to automatically generating affinity diagrams. More particularly, implementations of the present disclosure are directed to automatically generating affinity diagrams in digital form based on collaborative work executed by multiple users using real-world, physical media. As described in further detail herein, digital affinity diagrams are automatically generated based on physical media and data representative of human interactions with the physical media and/or each other during a session. Implementations of the present disclosure use artificial intelligence (AI) techniques to digitize and comprehend physical media and automatically re-arrange the physical media to provide an affinity diagram. Further, implementations of the present disclosure produce a digital affinity diagram in indexable file formats (e.g., PDF, DjVu) suitable for archival and search using an information retrieval system (IRS), for example.

FIG. 1 depicts an example system 100 in accordance with implementations of the present disclosure. As discussed in further detail herein, and using the system 100 as an illustrative example, implementations of the present disclosure can be realized using various hardware components. Example hardware components can include computing devices, digital cameras, microphones, and digital projectors. The digital cameras can each be provided as a high-resolution camera and can be provided as a still camera and/or a video camera. Accordingly, an image captured by a digital camera is of sufficient resolution such that the image is machine-readable to detect and read content captured in the image. For example, if physical media (e.g., a sticky note) includes text and is placed on a work surface, the digital camera should be able to capture an image of the physical media and process the text to reproduce the text in digital form.

The example system 100 includes a collaboration environment 102, a server system 104, and a network 106. The example system 100 further includes hardware devices 108, 110, 112 located at the collaboration environment 102. The hardware device 108 is provided as a digital projector, the hardware device 110 is provided as a sensory device, and the hardware device 112 is provided as a computing device 112.

Computing devices, such as the computing device 112, can each include any appropriate type of computing device, such as a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or any appropriate combination of any two or more of these data processing devices or other data processing devices. In the example system 100 of FIG. 1, the computing device 112 is depicted as a handheld computing device (e.g., a smart phone).

In accordance with implementations of the present disclosure, the hardware device 110 (also referred to herein as a sensing device) includes a stereoscopic camera system and a binaural microphone system that are respectively used to generate image data (and/or video data) and audio data. In some examples, the hardware device 110 is in wireless communication and/or wired communication with the hardware device 108 (also referred to herein as a projector). In some examples, the stereoscopic camera system includes multiple digital cameras (e.g., still cameras, video cameras, combined still/video cameras), and each can be provided as a high-resolution camera. In some examples, image data is provided that is representative of images. Each image is of sufficient resolution, such that the image is machine-readable to detect and read content (e.g., text, symbols) captured in the image. In some examples, images can be provided as stereoscopic images, where the image data includes depth data representative of depths of one or more objects depicted in the image (e.g., depth being based on a distance of an object from the stereoscopic camera system). In some examples, the binaural microphone system records audio through multiple, separate microphones to generate audio data having a stereophonic effect. In this manner, spatial dimensions of the audio can be captured and represented in the audio data (e.g., as spatial metadata associated with the audio data).

One or more of the hardware devices 108, 110, 112 can communicate with each another and/or the server system 104 over the network 106. The network 106 can include a large computer network, such as a local area network (LAN), a wide area network (WAN), the Internet, a cellular network, or a combination thereof connecting any number of mobile computing devices, fixed computing devices and server systems. The server system 106 can include one or more computing devices 120 and one or more machine-readable repositories, or databases 122.

In the example of FIG. 1, the collaboration environment 102 includes a work surface 140 and a projection surface 142. An example work surface can include a whiteboard and/or a sheet of paper (e.g., packing paper) hung on a wall. An example projection surface can include a whiteboard, a sheet of paper (e.g., packing paper) hung on a wall, and a projector screen. As described in further detail herein, physical media can be attached to the work surface 140 and digital representations of the physical media can be displayed on the projection surface 142. Although the work surface 140 and the projection surface 142 are depicted as separate surfaces, it is contemplated that a single surface can function as both a work and a projection surface.

In accordance with implementations of the present disclosure, a session can be conducted within the collaboration environment 102. In some examples, a session can include a period of time, during which a group of participants can work together to produce an output. In the context of the present disclosure, the group of participants work together to record ideas on physical media and place the physical media in space. In the example of FIG. 1, a moderator 150 and two or more participants 152 are active during a session to record ideas on physical media and place the physical media in space, such as hanging the physical media on, or sticking the physical media to the work surface.

Figure 2:
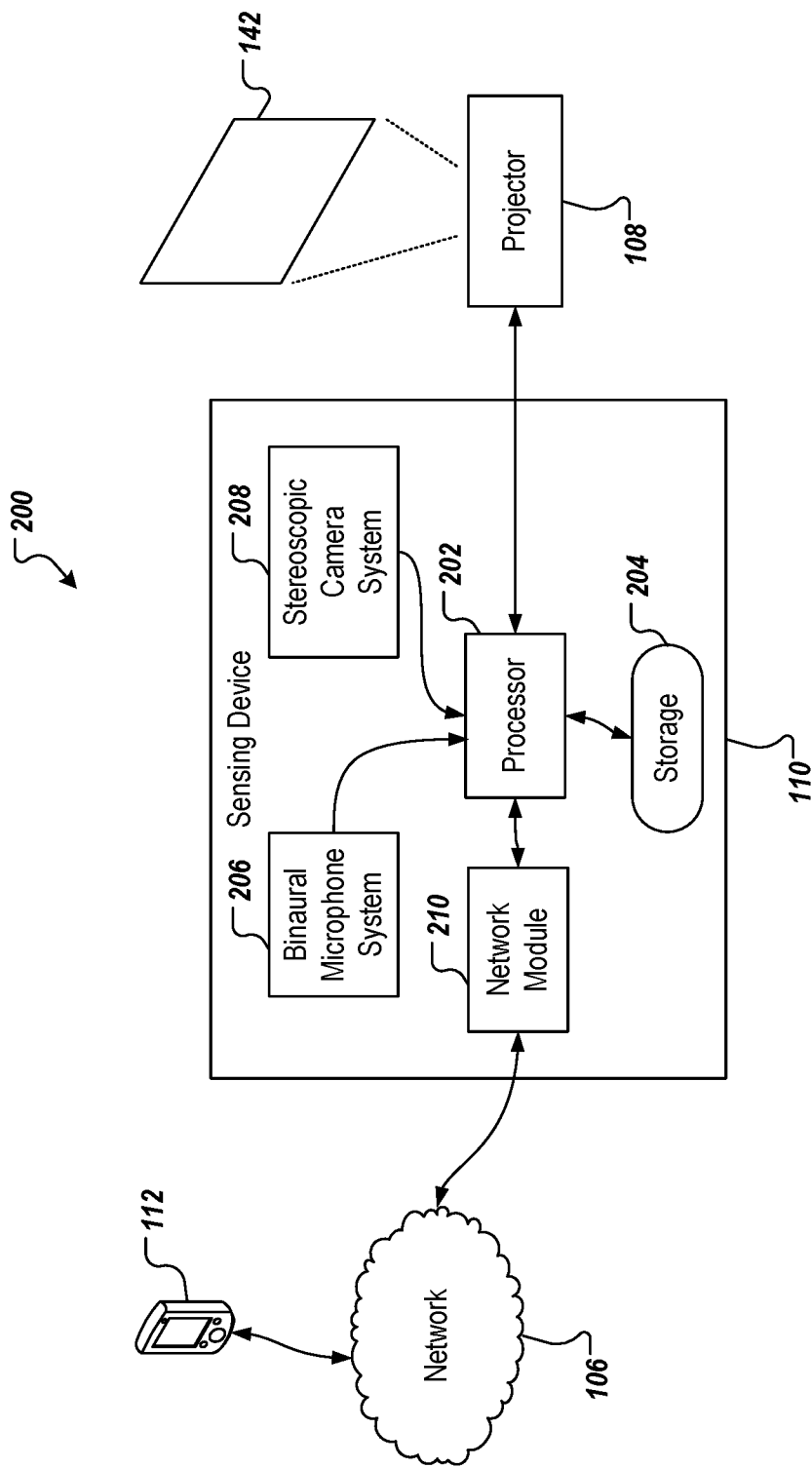
FIG. 2 is a block diagram of example components in accordance with implementations of the present disclosure.

FIG. 2 is a block diagram 200 of example components in accordance with implementations of the present disclosure. The block diagram 200 of FIG. 2 depicts the network 106, the hardware device 108 (projector), the hardware device 110 (sensing device), the hardware device 112, and the projection surface 142. In the example of FIG. 2, the hardware device 110 includes one or more processors 202, storage 204 (e.g., computer-readable memory), a binaural microphone system 206, a stereoscopic camera system 208, and a network module 210. In some implementations, the hardware device 110 is can be described as an add-on to the hardware device 108. That is, for example, the sensing device can be mounted to the projector. As an add-on, the hardware device 110 can be used in an existing collaborative environment (e.g., conference room, design thinking studio) and reduce hardware marginal costs (e.g., mounted to a projector already present in the collaborative environment). In some implementations, the hardware device 110 can be integrated into the hardware device 108.

In accordance with implementations of the present disclosure, the hardware device 110 includes an embedded computer system (e.g., Raspberry Pi6, Nvidia Jetson Nano7) that controls the hardware device 110. For example, the processor(s) 202, the storage 204, and/or the network module 210 can be part of the embedded computer system. In some examples, the projector is provided as the video output of the hardware device 110.

In some examples, the binaural microphone system 206 and the stereoscopic camera system 208 generate audio data and image data, respectively, which can be stored in the storage 204. In some examples, the network module 210 enables the hardware device 110 to communicate with one or more other devices, such as the hardware device 112, over the network 106. In some examples, and as described in further detail herein, the hardware device 110 communicates with the hardware device 108 to instruct the hardware device 108 to project digital representations of the physical media onto the projection surface 142. More particularly, and as described in further detail herein, the hardware device 110 communicates with the hardware device 108 to instruct the hardware device 108 to project an affinity diagram including digital representations of the physical media onto the projection surface 142, the affinity diagram including two or more groups of the digital representations.

In accordance with implementations of the present disclosure, the hardware device 110 (sensing device) is active during the session and is responsive to activity and audio generated during the session. That is, the hardware device 110 generates image data (which can also include video data) and audio data during the session. In some examples, the image data is representative of objects present during the session. For example, image data can be representative of a physical medium used during the session. In the example case of a sticky-note as a physical medium, the image data can be representative of the sticky-note and any content recorded thereon (e.g., writing on the sticky-note). As another example, the image data can be representative of a participant, who participated in the session (e.g., an image capturing a face of a participant). In some examples, the audio data is representative of verbal communication of participants during the session. Example verbal communication can include a participant discussing one or more ideas and/or one or more topics (e.g., explaining an idea associated with a topic to other participants). In some examples, an idea and/or a topic can be associated with a physical medium. For example, a participant can record content on a physical medium (e.g., write content on a sticky-note) and can verbally discuss the content, the content being associated with one or more topics. Another example verbal communication can include multiple participants communicating between each other (e.g., having a discussion about content recorded on a physical medium).

In some implementations, a set of digital objects can be generated and can be representative of physical media present during the session. That is, for example, each digital object can be representative of a physical medium (e.g., a sticky-note) and can record data associated with generation of the physical medium and ideas/topics associated therewith. In further detail, the hardware device 110 listens to and observes each participant as the participant places their respective sticky-note on the work surface 140. As a participant speaks, audio is recorded as audio data, and image data is recorded (e.g., the participant's movements, gestures). It can be determined that the participant placed a sticky-note on the work surface 140. For example, the image data can be processed to identify a gesture of the participant indicating placement of a sticky-note and/or the presence of the sticky-note on the work surface 140. In response to determining that a sticky-note is place on the work surface 140, an image of the sticky-note can be provided (e.g., a high-resolution image). In some examples, audio of the participant continues to record until it is determined that the participant has completed their discussion of their ideas/topics associated with the sticky note (e.g., the participant ceases speaking).

Accordingly, and in some implementations, a sub-portion of the session can be defined from the onset of a participant speaking, through placement of physical media, to conclusion of the participant speaking. In this manner, multiple sub-portions of the session can be provided, each sub-portion being associated with a respective participant and their placement of and discussion of a respective physical medium. For each sub-portion, the audio data and image data are analyzed using AI-processing to generate additional data. For example, the audio data can be processed through a speech-to-text program to generate text data representative of the participant's discussion. As another example, the image data can be processed using an optical character recognition (OCR) program to generate text data representative of content manually recorded on the physical medium (e.g., writing on the sticky-note). As still another example, image data (video data) can be processed using a gesture recognition program to generate gesture data representative of gestures of the participant during the participant's discussion during the sub-portion.

In some implementations, at least a portion of the AI-processing is executed by the hardware device 110. For example, the hardware device 110 can be programmed with one or more AI-programs for generating data, as described herein. In some implementations, at least a portion of the AI-processing is executed by one or more third-party service providers. For example, the hardware device 110 can transmit one or more requests to a third-party service provider (e.g., over the network 106 to a third-party service hosted on the server system 104). In some examples, a third-party service provider can provide a cloud-hosted AI-processing service. By way of non-limiting example, a request can be sent to a speech-to-text service and can include audio data that is to be processed to provide text data. A response can be provided, which includes the text data. Although examples are discussed herein, implementations of the present disclosure can process the audio data and/or the image data using any appropriate AI-technique to generate additional data representative of sub-portions of the session (e.g., facial recognition and/or voice recognition to identify participants).

In some implementations, at least a portion of the image data and/or at least a portion of the audio data are processed in real-time upon generation. For example, audio data is generated and is provided for processing in real-time. Accordingly, the onset of a participant speaking, through placement of physical media, to conclusion of the participant speaking are determined in real-time.

In accordance with implementations of the present disclosure, a digital object can be provided and can be representative of a sub-portion of the session. A set of digital objects can be provided, such that the digital objects in the set of digital objects are collectively representative of the session. In some examples, each digital object includes a set of data. Example data includes, without limitation, an image of the physical medium, medium text data representative of text recorded on the physical medium, participant text data representative of speech of the participant (e.g., a textual transcript), an image of the participant, audio data of the participant, an identifier of the participant (e.g., name, employee number). In some examples, the audio data and/or the image data include metadata representative of spatial dimensionality of recorded audio (e.g., location(s) of a source of speech recorded within the collaborative environment) and objects (e.g., location(s) of a participant within the collaborative environment, location of a physical medium on the work surface). Accordingly, the physical media are each represented as a data-rich document (digital object) including data that provides contextual information around the physical medium.

In some implementations, data of each digital object can be processed to associate one or more ideas and one or more topics with the digital object. For example, the text data can be processed to identify one or more one or more ideas and one or more topics that had been spoken by the participant. In some examples, one or more tags are provided (e.g., as metadata) to represent respective ideas/topics, and the tags are added to the digital object. In this manner, each digital object is enriched with idea data and/or topic data.

Figure 3B:
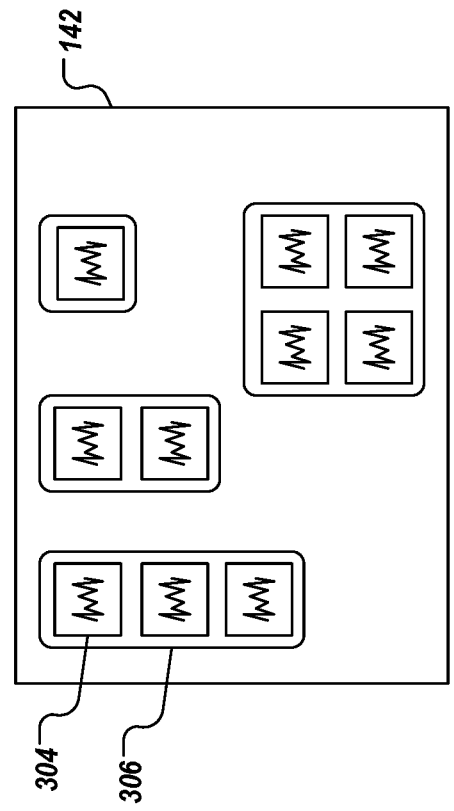
FIGS. 3A and 3B depict a progression of an example generation of affinity diagrams in accordance with implementations of the present disclosure.
Figure 3A:
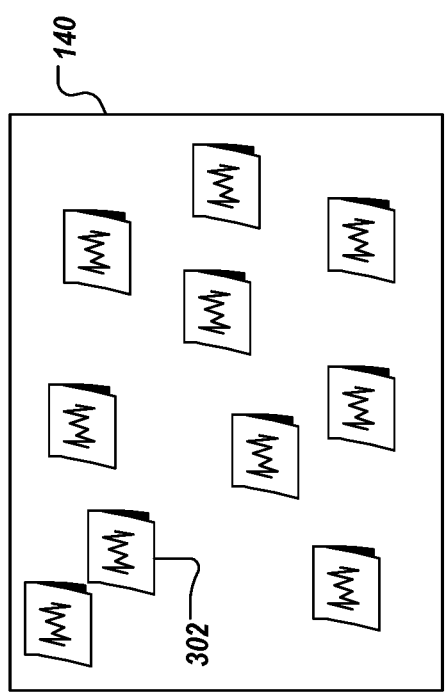

FIGS. 3A and 3B depict a progression of an example generation of affinity diagrams in accordance with implementations of the present disclosure. With particular reference to FIG. 3A, multiple sticky-notes 302 (i.e., physical media) are depicted on the work surface 140. As described herein, a plurality of participants can each place one or more sticky-notes 302 on the work surface 140. For each sticky-note 302, a sub-portion is provided and can be defined from the onset of a participant speaking, through placement of the sticky-note 302 on the work surface 140, to conclusion of the participant speaking. In some examples, after the sub-portion is complete (e.g., after the participant finishes speaking), a digital object representative of the sticky-note and the context around the sticky-note is provided, as described herein.

In some implementations, after all participants have placed their sticky-notes on the work surface 140 an end of the session can be indicated. For example, the moderator 150 can provide input (e.g., to the hardware device 112), the input indicating ending of the session. In response to completion of the session, the digital objects can be processed using one or more clustering programs to generate groups of digital objects (i.e., groups of digitized physical media). In some examples, each group includes one or more digital objects associated therewith. In some examples, each group is associated with one or more topics.

In some implementations, clustering is performed using one or more clustering techniques that implement unsupervised learning models. Example clustering techniques can include those commonly used for topic extraction and/or document clustering. In some examples, clustering is performed to determine topics associated with a document (e.g., a physical medium in the present context) to group documents having the same or similar topics together. Example clustering techniques can include, without limitation, term frequency—inverse document frequency (TF-IDF), Latent Dirichlet allocation (LDA), and Distributed Representations of Sentences and Documents (Doc2Vec).

In some implementations, a digital object representative of a physical medium is considered a document (e.g., an atomic data item to be further processed by the clustering algorithms). Example data content of the digital objects include, without limitation, an image of the physical medium, text data representative of written content on the physical medium, an identifier indicating the participant who provided the physical medium (e.g., author of the sticky-note), audio (voice recording) of the participant describing content of the physical medium, and a textual transcription of the audio.

In some implementations, group digital objects can be generated, each group digital object representative of a cluster provided from the digital objects, as described herein. In some examples, the group digital object is associated with the digital object(s) of each of the one or more digital objects assigned to the respective group. In some examples, a group digital object can include group data (e.g., one or more topic(s) that the group is representative of, a number of digital objects assigned to the group, a list of participants whose digital objects are included in the group).

In some examples, the work surface 140 can be moved (e.g., removed, rolled up) to expose, for example, the projection surface 142. The hardware device 108 can project digital representations of the physical media on the projection surface 142. In some examples, the digital representations include the images of the physical media as captured on the work surface 140. In some examples, the digital representations include a drawing representative of the physical media (e.g., a virtual sticky-note provided as a rectangle with text data generated from written content on the respective physical medium). In some examples, the digital representations are depicted in the same or approximate location of the physical medium that the respective digital representation represents. In some examples, a command can be issued (e.g., by the moderator 150) to group the digital representations into idea clusters. For example, movement of the digital representations can be animated as they move to their respective groups.

FIG. 3B depicts an example projection based on the sticky-notes of FIG. 3A. In FIG. 3B, digital representations 304 of the stick-notes 302 of FIG. 3A are displayed in groups 306 on the projection screen 142. In accordance with implementations of the present disclosure, the groups 306 displayed on the projection screen 142 collectively define an affinity diagram.

In some implementations, participants can generate data associated with the digital representations and/or groups. For example, after the affinity diagram is displayed on the projection screen 142, one or more participants can discuss digital representations and/or groups. In some implementations, the hardware device 110 records audio data and image data representative of participant interaction with the affinity diagram projected on the projection screen 142. In some implementations, the audio data and/or the image data can be processed, as described herein, to generate additional contextual data. In some examples, the additional contextual data can be associated with one or more digital objects representing respective digital representations of physical media projected. In some examples, the additional contextual data can be associated with one or more digital objects representing respective groups. In some implementations, the projection can be updated to project based on the additional contextual data.

In some implementations, the participants are able to override the automatically generated groups. In some examples, a participant can use a gesture (e.g., drag-and-drop) to move a digital representation from one group to another group. For example, a participant can select a virtual sticky-note projected on the projection screen 142 using their fingers and move the virtual sticky-note, as if it were a physical sticky-note (e.g., movement of the selected virtual sticky-note is animated across the projection screen 142). In some implementations, the digital object representative of the sticky-note and/or the group digital objects (e.g., the group digital object the virtual sticky-note is moved from and the group digital object the sticky note is moved to) are updated to reflect the feedback.

In accordance with implementations of the present disclosure, the digital objects and the affinity diagram are digitally stored. For example, at the end of the session, the moderator 150 can download the digital objects and the affinity diagram (e.g., to the hardware device 112, to the server system 104). In this manner, the digital objects and the affinity diagram can be archived and/or distributed (e.g., emailed to the participants). In some examples, the affinity diagram is provided in an electronic paper format (e.g., PDF, DjVu). In some examples, the session and/or affinity diagram can be provided in a multi-media format, in which the voice transcription and/or recording of each participant describing respective physical media are included as annotations in respective digital representations of the physical media (e.g., stick-note image). In this manner, the session and/or individual physical media can be replayed to enable a user to experience the session from the perspective of the projector.

Figure 4:
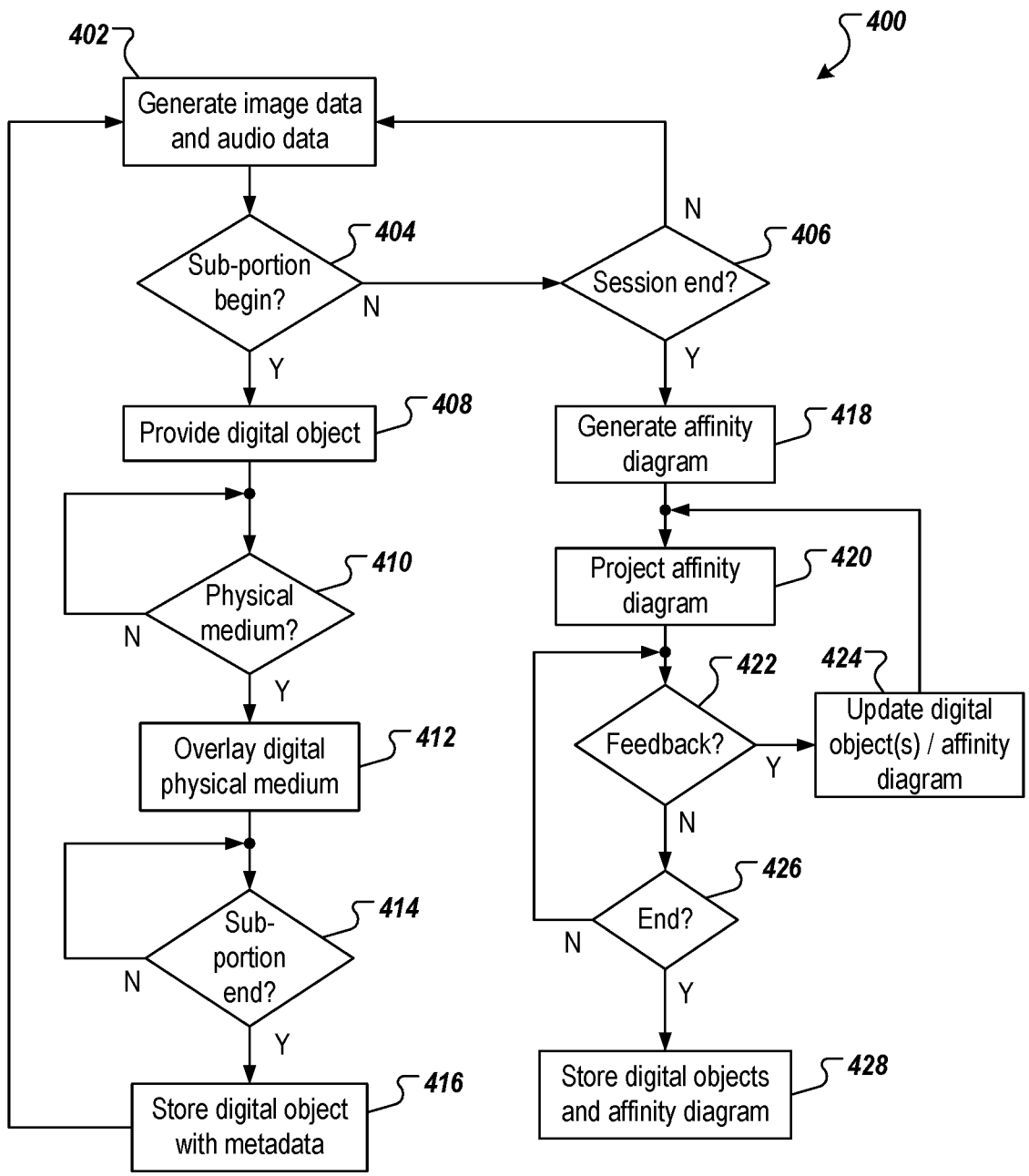
FIG. 4 is a flowchart of an example process that can be executed in accordance with implementations of the present disclosure.

FIG. 4 is a flowchart of an example process 400 that can be executed in accordance with implementations of the present disclosure. In some implementations, the example process 400 may be performed using one or more computer-executable programs executed using one or more computing devices. The example process 400 can be performed for automatically generating digital affinity diagrams from physical media.

Image data and audio data are generated (402). For example, and as described herein, a collaborative work can include a moderator (e.g., the moderator 150 of FIG. 1) and two or more participants (e.g., the participants 152 of FIG. 1). Upon start of the collaborative work, a sensing device (e.g., the hardware device 110 of FIGS. 1 and 2) can begin generating image data and audio data. In some examples, the collaborative work includes a session, during which participants present one or more ideas and/or one or more topics to other participants, and present one or more physical media (e.g., hang a stick-note on the work surface 140 of FIGS. 1 and 3A). In some examples, upon start of the session, the sensing device can begin generating image data and audio data. In some examples, the sensing device begins generating image data and audio data in response to input (e.g., the moderator 150 provides input instructing the sensing device to begin audio/video recording). Although the example process 400 begins with generating image data and audio data, it is contemplated that image data and audio data are generated throughout the duration of the collaborative work.

It is determined whether a sub-portion has begun (404). For example, it is determined whether a participant has begun discussing one or more ideas/topics. In some examples, whether a participant has begun discussing one or more ideas/topics is determined based on processing the image data and/or the audio data using one or more AI-techniques, as described herein. In one non-limiting example, the audio data can be processed to provide a textual transcript and the text data can be processed to identify an indication that a participant has begun discussing one or more ideas/topics. In another non-limiting example, the image data can be processed to identify occurrence of a gesture or set of gestures indicating that a participant has begun discussing one or more ideas/topics (e.g., a participant standing, walking toward a work surface, and turning to face other participants). In some examples, the audio data and image data can collectively indicate that a participant has begun discussing one or more ideas/topics (e.g., speech indicating that a participant has begun discussing one or more ideas/topics, and concurrent gesture(s) also that the participant has begun discussing one or more ideas/topics).

In some examples, an identity of the participant can be determined based on one or more of the image data and the audio data (e.g., voice recognition, facial recognition).

If a sub-portion has not begun, it is determined whether the session has ended (406). For example, it can be determined whether an indication has been provided that the session has ended (e.g., that participant presentations have been completed). In one non-limiting example, the moderator can provide input (e.g., to the hardware device 112) indicating that the session has ended. As another non-limiting example, whether the session has ended is determined based on processing the image data and/or the audio data using one or more AI-techniques, as described herein. In one non-limiting example, the audio data can be processed to provide a textual transcript and the text data can be processed to identify an indication that the session has been completed. In another non-limiting example, the image data can be processed to identify occurrence of a gesture or set of gestures indicating that the session has ended. In some examples, the audio data and image data can collectively indicate that the session has ended. In some examples, an identity of the moderator can be determined based on one or more of the image data and the audio data (e.g., voice recognition, facial recognition). If the session has not ended, the example process 400 loops back.

If a sub-portion has begun (as determined at (404)), a digital object representative of the sub-portion is provided (408). For example, a data structure for the digital object is created to be available for storing data as generated during the sub-portion. As described above, image data and audio data is continuously generated during the sub-portion. It is determined whether a physical medium has been placed (410). In some examples, whether a physical medium has been placed is determined based on processing the image data and/or the audio data using one or more AI-techniques, as described herein. In one non-limiting example, the image data can be processed to identify a presence of the physical media on the work surface. In another non-limiting example, the image data can be processed to identify occurrence of a gesture or set of gestures indicating that the physical medium has been placed. If it is determined that a physical medium has not been placed, the example process 400 loops back.

If it is determined that a physical medium has been placed, a digital representation of the physical medium is projected over the physical medium (412). For example, and as described herein, an image of the physical medium can be captured and a digital representation of the physical medium is generated based thereon. By projecting the digital representation of the physical medium over the physical medium, participants and/or the moderator recognize that the physical medium has been digitally recorded.

It is determined whether the sub-portion has ended (414). For example, it is determined whether the participant has ceased discussing the one or more ideas/topics. In some examples, whether the participant has ceased discussing the one or more ideas/topics is determined based on processing the image data and/or the audio data using one or more AI-techniques, as described herein. In one non-limiting example, the audio data can be processed to provide a textual transcript and the text data can be processed to identify an indication that the participant has concluded discussing the one or more ideas/topics. In another non-limiting example, the image data can be processed to identify occurrence of a gesture or set of gestures indicating that the participant has concluded discussing the one or more ideas/topics (e.g., walking away from the work surface, and sitting down). In some examples, the audio data and image data can collectively indicate that the participant has concluded discussing the one or more ideas/topics (e.g., speech indicating that a participant has concluded discussing the one or more ideas/topics, and concurrent gesture(s) that also indicate that the participant has concluded discussing the one or more ideas/topics). If the sub-portion has not ended, the example process 400 loops back. If the sub-portion has ended, the digital object and metadata representative of the sub-portion are stored (416), and the example process 400 loops back.

If the session has ended (as determined at (406)), an affinity diagram is generated (418). For example, and as described herein, data of the digital objects representative of the physical media are processed using a clustering algorithm to cluster digital objects into two or more groups. The affinity diagram is projected (420). For example, and as described herein, the affinity diagram is projected onto a projection surface (e.g., as depicted in FIG. 3B). In some examples, the digital representations are initially depicted in the same or approximate location of the physical medium that the respective digital representation represents. In some examples, a command can be issued (e.g., by the moderator 150) to group the digital representations into the affinity diagram. For example, movement of the digital representations can be animated as they move to their respective groups that make up the affinity diagram.

It is determined whether any feedback is provided (422). In some examples, whether the feedback is provided is determined based on processing the image data and/or the audio data using one or more AI-techniques, as described herein. In one non-limiting example, the audio data can be processed to provide a textual transcript and the text data can be processed to identify feedback to one or more of the digital representations depicted in the affinity diagram. In another non-limiting example, the image data can be processed to identify occurrence of a gesture or set of gestures indicating that a participant has provided feedback to one or more of the digital representations depicted in the affinity diagram. In some examples, the audio data and image data can collectively indicate whether feedback has been provided to one or more of the digital representations depicted in the affinity diagram. Example feedback can include moving a digital representation from one group to another group, as described herein (e.g., a drag-and-drop gesture of a participant on the affinity diagram). If feedback is provided, one or more digital objects and/or the affinity diagram are updated based on the feedback (424), and the example process 400 loops back. If no feedback is provided, it is determined whether the collaborative work has ended (426). If the collaborative work has not ended, the example process 400 loops back. If the collaborative work has ended, the digital objects and affinity diagram are stored (428), and the example process 400 ends.

Figure 5:
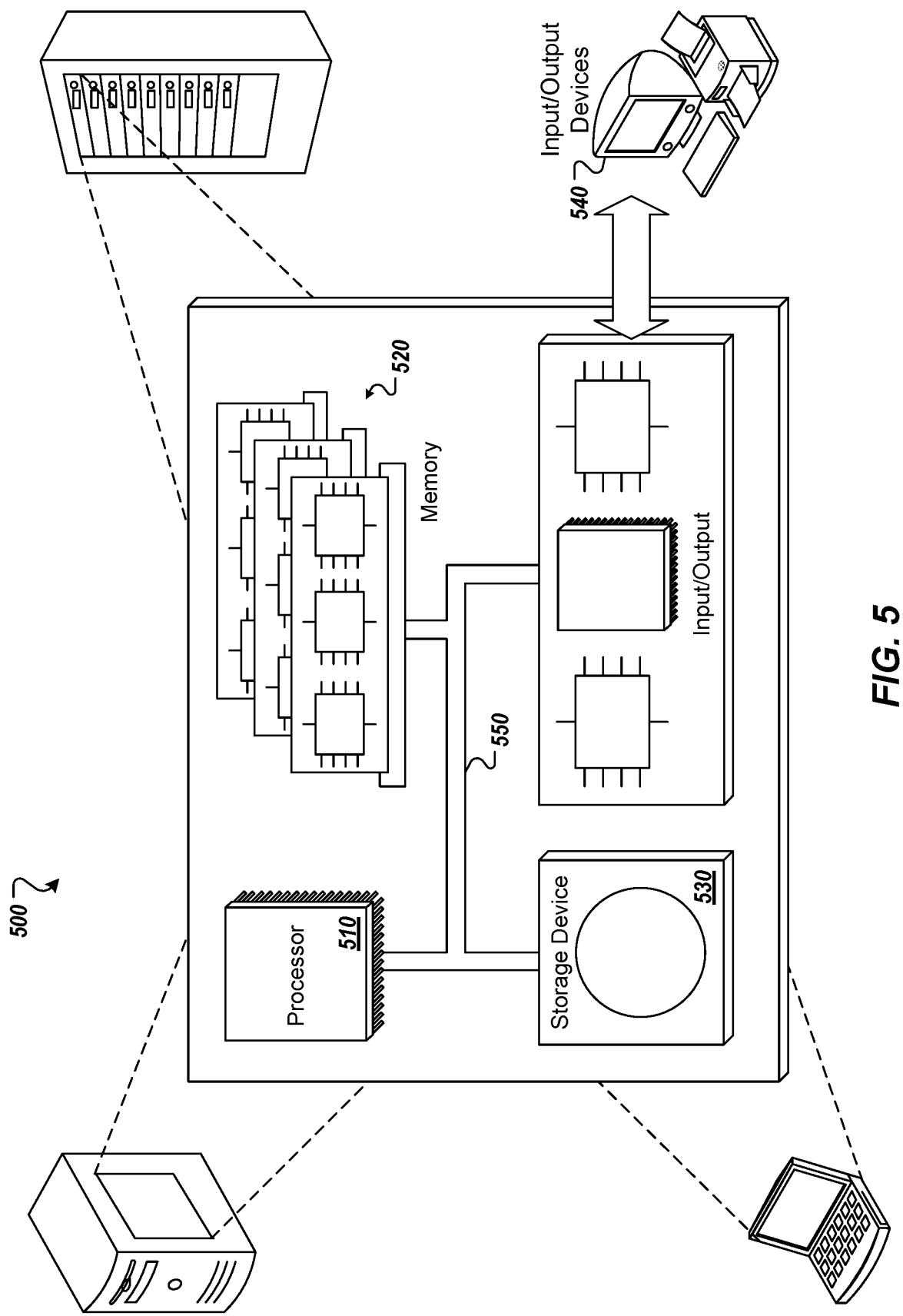
FIG. 5 is a schematic diagram of an example computing system that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatically generating digital affinity diagrams from physical media, the method comprising:

generating, by a sensing device, image data and audio data during a collaborative work within a collaborative environment, the sensing device comprising a stereoscopic camera system and a binaural microphone system;

during a session of the collaborative work and for each physical medium of a set of physical media affixed to a work surface within the collaborative environment:

determining that a physical medium has been affixed to the work surface by processing image data representative of the work surface, and, in response, providing a digital object comprising data representative of the physical medium, the digital object representing a sub-portion of the session and the data comprising an image of the physical medium, one or more topics that the physical medium is associated with, and audio data representative of speech of a participant that affixed the physical medium to the work surface, and adding the digital object to a set of digital objects that is to be processed after the session of the collaborative work has ended; and determining that a session of the collaborative work has ended, and in response, automatically:

processing at least a portion of data of digital objects in the set of digital objects using one or more clustering algorithms to provide two or more groups of digital objects, each digital object representative of a respective physical medium; and providing an affinity diagram comprising the two or more groups of digital objects, the affinity diagram being displayed as digital representations of the physical media, the digital representations being grouped in the two or more groups.

2. The method of claim 1, wherein the digital objects are clustered based on the one or more topics that the physical media are each associated with.

3. The method of claim 1, wherein text data is generated from the image data, the text data being processed to determine at least one topic of the one or more topics.

4. The method of claim 1, wherein gesture data is generated from the image data, the gesture data representative of one or more gestures of participants.

5. The method of claim 4, determining that physical media have been affixed to the work surface within the collaborative environment is based on the gesture data.

6. The method of claim 1, determining that physical media have been affixed to the work surface within the collaborative environment is based on the image data.

7. The method of claim 1, further comprising determining that feedback has been provided to the affinity diagram and, in response, updating one or more of the groups of digital objects.

8. A non-transitory computer-readable storage medium coupled to one or more processors and having instructions stored thereon which, when executed by the one or more processors, cause the one or more processors to perform operations for automatically generating digital affinity diagrams from physical media, the operations comprising:

generating, by a sensing device, image data and audio data during a collaborative work within a collaborative environment, the sensing device comprising a stereoscopic camera system and a binaural microphone system;

during a session of the collaborative work and for each physical medium of a set of physical media affixed to a work surface within the collaborative environment:
  determining that a physical medium has been affixed to the work surface by processing image data representative of the work surface, and, in response, providing a digital object comprising data representative of the physical medium, the digital object representing a sub-portion of the session and the data comprising an image of the physical medium, one or more topics that the physical medium is associated with, and audio data representative of speech of a participant that affixed the physical medium to the work surface, and
  adding the digital object to a set of digital objects that is to be processed after the session of the collaborative work has ended; and determining that a session of the collaborative work has ended, and in response, automatically:
  processing at least a portion of data of digital objects in the set of digital objects using one or more clustering algorithms to provide two or more groups of digital objects, each digital object representative of a respective physical medium; and
  providing an affinity diagram comprising the two or more groups of digital objects, the affinity diagram being displayed as digital representations of the physical media, the digital representations being grouped in the two or more groups.

9. The computer-readable storage medium of claim 8, wherein the digital objects are clustered based on the one or more topics that the physical media are each associated with.

10. The computer-readable storage medium of claim 8, wherein text data is generated from the image data, the text data being processed to determine at least one topic of the one or more topics.

11. The computer-readable storage medium of claim 8, wherein gesture data is generated from the image data, the gesture data representative of one or more gestures of participants.

12. The computer-readable storage medium of claim 11, determining that physical media have been affixed to the work surface within the collaborative environment is based on the gesture data.

13. The computer-readable storage medium of claim 8, determining that physical media have been affixed to the work surface within the collaborative environment is based on the image data.

14. The computer-readable storage medium of claim 8, wherein operations further comprise determining that feedback has been provided to the affinity diagram and, in response, updating one or more of the groups of digital objects.

15. A system, comprising:
a computing device located within a collaborative environment; and
a computer-readable storage device coupled to the computing device and having instructions stored thereon which, when executed by the computing device, cause the computing device to perform operations for automatically generating digital affinity diagrams from physical media, the operations comprising:

generating, by a sensing device, image data and audio data during a collaborative work within a collaborative environment, the sensing device comprising a stereoscopic camera system and a binaural microphone system;

during a session of the collaborative work and for each physical medium of a set of physical media affixed to a work surface within the collaborative environment:
  determining that a physical medium has been affixed to the work surface by processing image data representative of the work surface, and, in response, providing a digital object comprising data representative of the physical medium, the digital object representing a sub-portion of the session and the data comprising an image of the physical medium, one or more topics that the physical medium is associated with, and audio data representative of speech of a participant that affixed the physical medium to the work surface, and
  adding the digital object to a set of digital objects that is to be processed after the session of the collaborative work has ended; and determining that a session of the collaborative work has ended, and in response, automatically:
  processing at least a portion of data of digital objects in the set of digital objects using one or more clustering algorithms to provide two or more groups of digital objects, each digital object representative of a respective physical medium; and
  providing an affinity diagram comprising the two or more groups of digital objects, the affinity diagram being displayed as digital representations of the physical media, the digital representations being grouped in the two or more groups.

16. The system of claim 15, wherein the digital objects are clustered based on the one or more topics that the physical media are each associated with.

17. The system of claim 15, wherein text data is generated from the image data, the text data being processed to determine at least one topic of the one or more topics.

18. The system of claim 15, wherein gesture data is generated from the image data, the gesture data representative of one or more gestures of participants.

19. The system of claim 18, determining that physical media have been affixed to the work surface within the collaborative environment is based on the gesture data.

20. The system of claim 15, determining that physical media have been affixed to the work surface within the collaborative environment is based on the image data.

* * * * *